United States Patent
Maeng

(10) Patent No.: US 8,997,016 B1
(45) Date of Patent: Mar. 31, 2015

(54) METHODS, DEVICES, AND MEDIUMS ASSOCIATED WITH DISPLAYING AN ELECTRONIC PANE

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 390 days.

(21) Appl. No.: 12/984,478

(22) Filed: Jan. 4, 2011

(51) Int. Cl.
*G06F 17/00* (2006.01)

(52) U.S. Cl.
USPC ........... 715/784; 715/240; 715/246; 715/764; 715/781; 715/788

(58) Field of Classification Search
CPC .................................................... G06F 17/241
USPC ......... 715/240, 246, 764, 781, 797, 204, 230, 715/784, 786, 788
See application file for complete search history.

(56) References Cited

U.S. PATENT DOCUMENTS

| | | | |
|---|---|---|---|
| 5,917,483 A * | 6/1999 | Duncan et al. ................. | 715/802 |
| 6,567,830 B1 * | 5/2003 | Madduri ....................... | 715/235 |
| 7,243,299 B1 * | 7/2007 | Rubin et al. ................... | 715/209 |
| 8,135,711 B2 * | 3/2012 | Charnock et al. ............. | 707/728 |
| 2005/0034056 A1 * | 2/2005 | Rubin et al. ................... | 715/500 |
| 2007/0266336 A1 * | 11/2007 | Nojima et al. ................. | 715/792 |
| 2008/0184157 A1 * | 7/2008 | Selig .............................. | 715/781 |
| 2011/0231286 A1 * | 9/2011 | Dierks ........................ | 705/26.41 |
| 2011/0289404 A1 * | 11/2011 | Fleur et al. ..................... | 715/255 |

OTHER PUBLICATIONS

Ebay.com, Published 2009, Screen Shots, retrieved from Internet, Wayback Machine.*

* cited by examiner

*Primary Examiner* — Stephen Hong
*Assistant Examiner* — Matthew Ludwig
(74) *Attorney, Agent, or Firm* — Stolowitz Ford Cowger LLP

(57) ABSTRACT

A method, device, or medium may display an electronic document in an electronic window. An electronic pane may be displayed over a portion of the electronic document. Objects may be displayed in the electronic pane. The electronic pane and the object in the electronic pane may be associated with a location in the electronic window and/or a location in the electronic document and the electronic pane moved according to movements of the electronic window and/or electronic document.

46 Claims, 9 Drawing Sheets

METHODS, DEVICES, AND MEDIUMS ASSOCIATED WITH DISPLAYING AN ELECTRONIC PANE

BACKGROUND

Different objects may be located in different sections of a known electronic document. The objects may comprise text, figures, media clips, images, or the like, or combinations thereof. For example, the figures may be located in a first section of the electronic document and text describing the figures may be located in a second section of the electronic document. A known computer system may display the electronic document in an electronic window on a computer screen. A user may want to view the figures in the electronic document and view the text in the electronic document at the same time. In one example, the user may want to print the figures and view the printed figures while reading the text from the electronic document on the computer screen. However, a printer may not be readily available for printing the figures or there may be insufficient space for viewing the computer screen and viewing the printed figures at the same time. For example, the user may be traveling in an airplane with no printer and with limited room for viewing printed documents.

In another example, the user may direct the known computer system to display the text from a first electronic window on the computer screen and may direct the known computer system to display the figures from a second electronic window on the computer screen. The known computer system may display the first electronic window over the second electronic window covering all or part of the figures. The user may select the second electronic window in order to view the figures. In response to selection of the second electronic window, the known computer system may display the second electronic window over the first electronic window and cover all or part of the text displayed in the first electronic window. In order to view both the text and drawings of the electronic document, the user may need to repeatedly select between the first and second electronic window.

DETAILED DESCRIPTION

Figure 1:
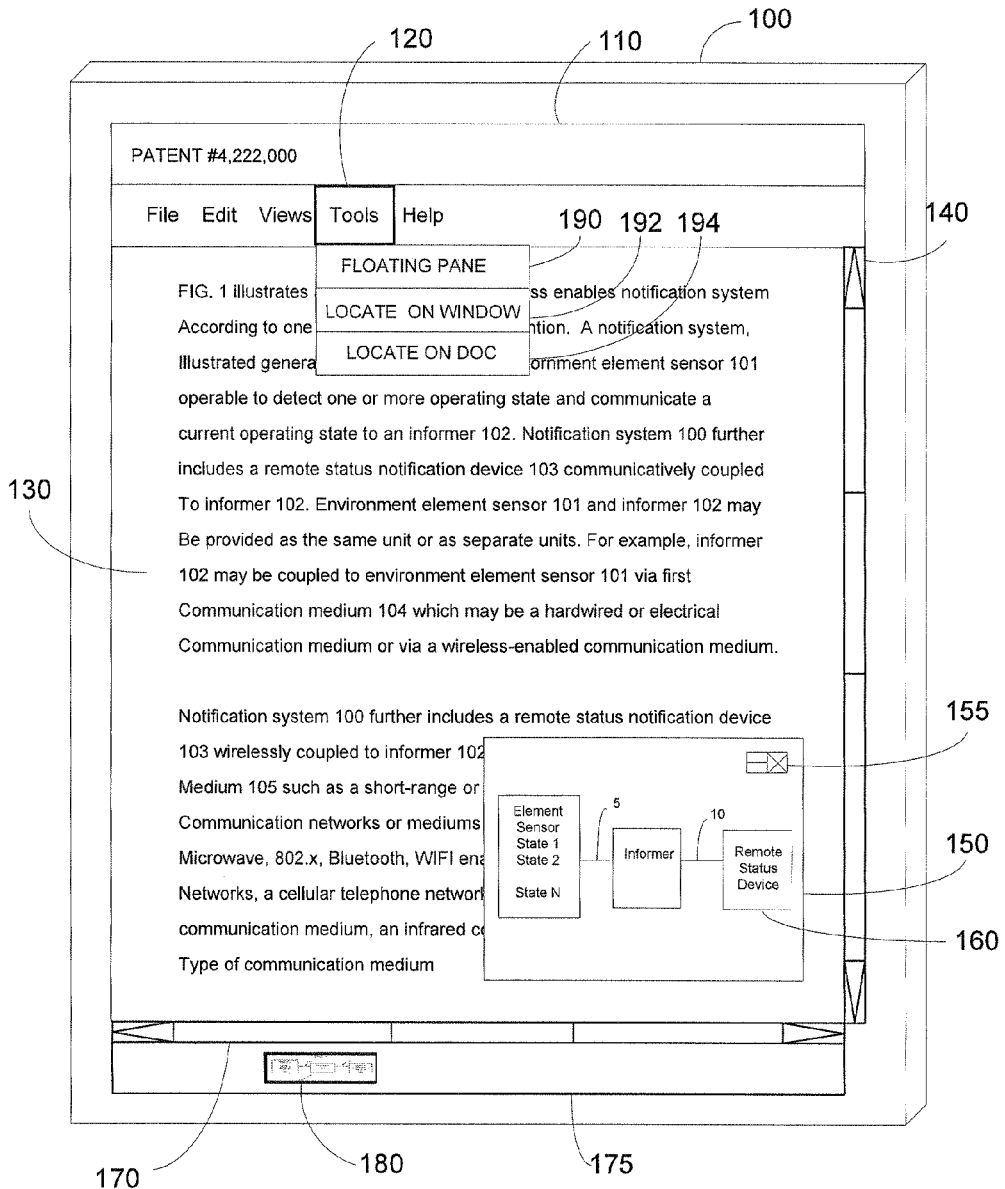
FIG. 1 depicts an example of a computer system configured to display an electronic pane.

FIG. 1 depicts an example of a computer system 100 configured to display an electronic pane 150 over an electronic document 130. Computer system 100 may be a personal computer (PC), a laptop computer, a smart phone, a personal digital assistant (PDA), a computer terminal, a television, an electronic notebook, an electronic reader, a network server, or the like, or any combination thereof. Computer system 100 may be configured to open electronic document 130 in an electronic window 110. For example, a user may select a software application and/or a software file. Computer system 100 may open electronic window 110 and display electronic document 130 in response to the user selection of the software application and/or the software file.

Computer system 100 may be configured to open electronic pane 150 in response to selection of a menu item displayed in a tool bar 120 of electronic window 110. For example, computer system 100 may display electronic pane 150 over electronic document 130 in response to selection of a first menu item 190. Computer system 100 also may be configured to open and to display multiple electronic panes 150 in electronic window 110. For example, computer system 100 may be configured to open another electronic pane in response to a subsequent selection of menu item 190.

Electronic document 130 and electronic pane 150 may display objects, such as text, figures, drawings, graphs, tables, images, media clips, e.g., video and/or audio clips, software applications, or the like, or any combination thereof. Computer system 100 also may be configured to display selectable control functions, such as play, pause, fast forward, and/or capture in response to copying a video clip into electronic pane 150.

Electronic document 130 and object 160 may be created by any known document display and/or editing software application in any known associated format, such as Microsoft® Word®, PowerPoint®, Excel® spreadsheet, Adobe Systems® Portable Document Format (PDF), Hyper Text Markup Language (HTML), or the like, or any combination thereof.

During an exemplary operation of computer system 100, at least a portion of electronic document 130 may be covered by electronic pane 150. In this example, computer system 100 may be configured to move electronic pane 150 in response to a user request and to display those portions of electronic document 130 which previously were covered by electronic pane 150. For example, a user may move electronic pane 150 to a different location in electronic window 110 via mouse commands. In another example, computer system 100 may be configured to scroll through electronic document 130 to uncover those portions of electronic document 130 previously covered by electronic pane 150. For example, electronic document 130 may be configured to scroll up, down, left, and/or right in electronic window 110 in response to selection and/or moving of scroll bars 140 and/or 170. Electronic document 130 also may be configured to be scrolled in different directions in response to movements of a cursor in electronic document 130.

Computer system 100 may be configured to display electronic pane 150 at a same location in electronic window 110 or to display electronic pane 150 at a same location in electronic document 130. For example, computer system 100 may be configured to display a "LOCATE ON WINDOW" menu item 192 in tool bar 120 and to display electronic pane 150 at a location associated with electronic window 110 in response to the selection of menu item 192. In one example, computer system 100 may be configured to display electronic pane 150 in a same location in electronic window 110 while moving electronic window 110 to different locations on a computer screen. Computer system 100 also may be configured to display electronic pane 150 in a same location in electronic window 110 while moving electronic document 130. For example, computer system 100 may be configured to display electronic pane 150 in a same location in electronic window 110 while scrolling through electronic document 130.

Computer system 100 may be configured to associate electronic pane 150 with different locations in electronic window 110. For example, the user may move electronic pane 150 from a first, e.g., a current, location in electronic window 110 to a second, e.g., a new, location in electronic window 110. Computer system 100 also may be configured to associate electronic pane 150 with the second location in electronic window 110. For example, computer system 100 further may be configured to maintain electronic pane 150 in the second location in electronic window 110 while moving electronic window 110 to different locations on the computer screen or while scrolling through electronic document 130.

Moreover, computer system 100 may be configured to display a "LOCATE ON DOC" menu item 194 from tool bar 120. Computer system 100 also may be configured to display electronic pane 150 at a location associated with electronic document 130 in response to a selection of menu item 194. For example, computer system 100 may be configured to maintain electronic pane 150 in a same location in electronic document 130 while moving electronic window 110 to different locations on the computer screen. Computer system 100 further may be configured to maintain electronic pane 150 in the same location in electronic document 130 while scrolling and/or moving through electronic document 130.

Further, computer system 100 may be configured to associate electronic pane 150 with a new location in electronic document 130. For example, the user may move electronic pane 150 from the first location in electronic document 130 to the second location in electronic document 130. Computer system 100 also may be configured to associate electronic pane 150 with the second location in electronic document 130. For example, computer system 100 may be configured to maintain electronic pane 150 in the second location in electronic document while scrolling and/or moving through electronic document 130.

Computer system 100 may be configured to close electronic pane 150 in response to a selection of a first one of icons 155 and to minimize electronic pane 150 in response to selection of a second one of icons 155. For example, computer system 100 may be configured to minimize electronic pane 150 into an identifier 180 and to display identifier 180 in a task bar 175 in response to the selection of the second one of the icons 155. Identifier 180 may be configured to display a thumbnail image of object 160 or to display a different identifier of electronic pane 150, such as a name or an image associated with electronic pane 150.

Computer system 100 may be configured to copy object 160 from electronic document 130. For example, the user may navigate to a location in electronic document 130 containing object 160. The user then may select object 160, e.g., click on object 160 or draw a box around object 160 using an input device, such as a keyboard, a mouse, a touch screen, or the like, or any combination thereof. The user then may direct computer system 100 to copy object 160 into electronic pane 150. For example, the user may initiate a copy request, move a cursor into electronic pane 150, and initiate a paste request. Computer system 100 may be configured to copy object 160 into electronic pane 150 in response to the request.

Computer system 100 may be configured to copy object 160 from another electronic document different from electronic document 130. For example, the user may select object 160 from the another electronic document and request computer system 100 to copy object 160 from the another electronic document into electronic pane 150.

Computer system 100 may be configured to resize electronic pane 150 and/or object 160. For example, computer system 100 may be configured to resize electronic pane 150 and/or object 160 in response to a user selecting and moving an edge of electronic pane 150. Computer system 100 also may be configured to resize object 160 and to maintain a same size for electronic pane 150. For example, computer system 100 may be configured to change the size of object 160 in response to the user initiating a zoom-in and/or a zoom-out command. Computer system 100 further may be configured to display a different portion of object 160 in electronic pane 150. For example, computer system 100 may be configured to display a different portion of object 160 from electronic pane 150 in response to a user selecting and moving object 160 to a different location in electronic pane 150.

Figure 2A:
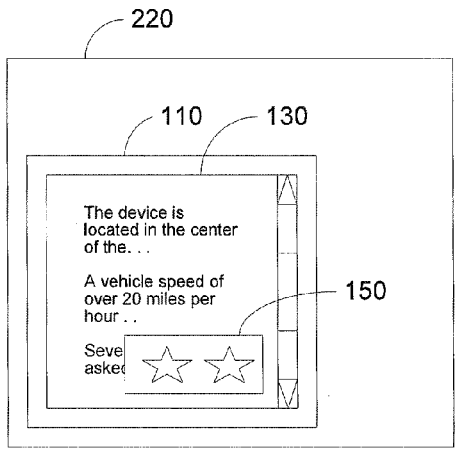
FIGS. 2A and 2B depict an example of a computer system configured to move the electronic pane.
Figure 2B:
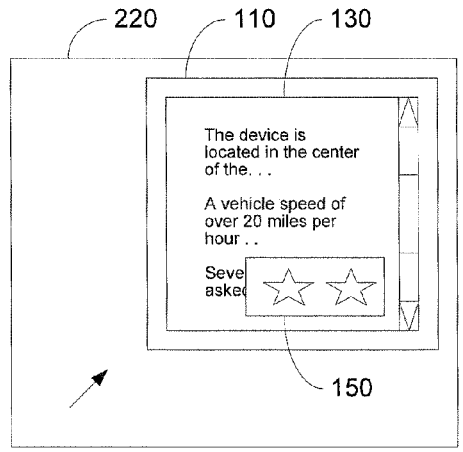

FIGS. 2A and 2B depict an example of a computer system, as set forth in FIG. 1, configured to associate electronic pane 150 with a location in electronic window 110. In FIG. 2A, the computer system may be configured to display electronic window 110 in a lower left-hand corner of a display screen 220, to display electronic document 130 electronic window 110, and to display electronic pane 150 in located a lower right hand corner of electronic window 110.

In FIG. 2B, the computer system may be configured to move electronic window 110 to an upper right hand corner of computer screen 220. For example, a user may move electronic window 110 from the lower left hand corner of display screen 220 to the upper right hand corner of display screen 220. In one example, the computer system may be configured to synchronize movement of electronic pane 150 with the movement of electronic window 110. For example, electronic pane 150 may continue to remain in a same position in the lower right hand corner of electronic window 110 while electronic window 110 moves from the lower left hand corner of computer screen 220 to the upper right hand corner of computer screen 220.

Figure 3A:
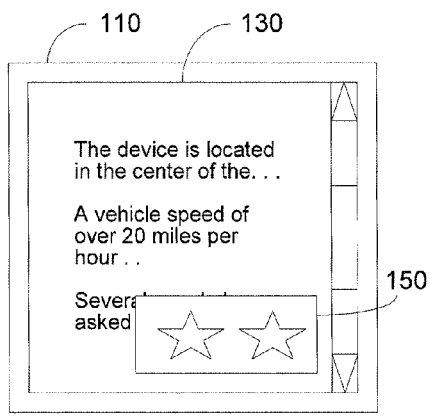
FIGS. 3A and 3B depict an example of a computer system configured to associate the electronic pane with a location in an electronic window.
Figure 3B:
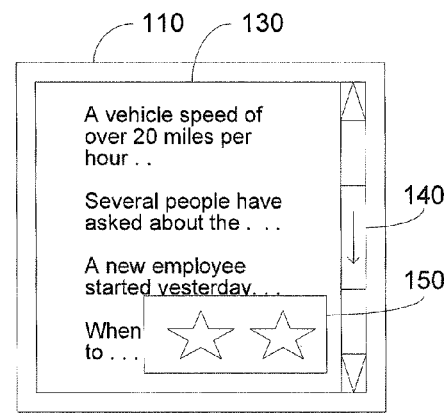

FIGS. 3A and 3B depict another example of a computer system, as set forth in FIG. 1, configured to associate electronic pane 150 with a location in electronic window 110. The computer system depicted in FIG. 3A may be configured to display a first section of electronic document 130 in electronic window 110. The computer system also may be configured to display electronic pane 150 in a lower right hand corner of electronic window 110.

The computer system depicted in FIG. 3B also may be configured to display a second section of the electronic document 130 in electronic window 110. For example, the computer system may be configured to scroll through electronic document 130 up in electronic window 110 in response to a selection of a scroll bar 140. The computer system also may be configured to maintain electronic pane 150 in a same location in electronic window 110 independently of movement or manipulation of electronic document 130. For example, the computer system depicted in FIG. 3B may be configured to maintain electronic pane 150 in the lower right hand corner of electronic window 110 when scrolling electronic document 130.

Figures 4A, 4B, 5A, 5B:
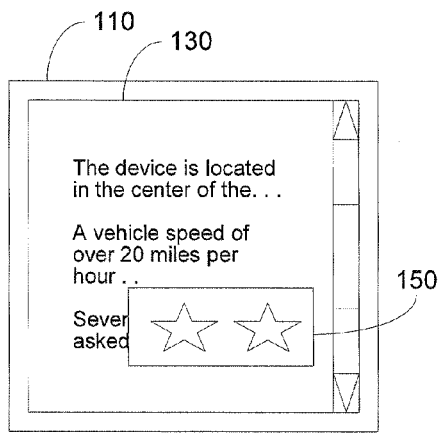
FIGS. 4A and 4B depict another example of a computer system configured to associate the electronic pane with a location in an electronic document.
FIGS. 5A and 5B depict an example of a computer system configured to display multiple electronic panes.

FIGS. 4A and 4B depict another example of a computer system, as set forth in FIG. 1, configured to associate electronic pane 150 with a location in electronic document 130. The computer system depicted in FIG. 4A may be configured to display a first section of electronic document 130 in electronic window 110 and to display electronic pane 150 in a lower right hand corner of electronic window 110. The computer system depicted in FIG. 4B may be configured to display a second section of electronic document 130 in electronic window 110. For example, the computer system may be configured to scroll through electronic document 130 up in electronic window 110 in response to a selection of scroll bar 140.

The computer system also may be configured to move electronic pane 150 in response to movements of electronic document 130. For example, the computer system may be configured to scroll through electronic pane 150 in response to scrolling of electronic document 130. The computer system, as depicted in FIG. 4A and FIG. 4B, may synchronize movement of electronic pane 150 with movement of electronic document 130 to maintain the electronic pane 150 in a same location in electronic document 130.

FIGS. 5A and 5B depict another example of a computer system, as set forth in FIG. 1, configured to display a first electronic pane 150 and a second electronic pane 152 over electronic document 130. In one example, the computer system may be configured to display object 160 in electronic pane 150 and display a different object 162 in electronic pane 152.

The computer system depicted in FIG. 5A may be configured to display a first section of electronic document 130. The computer system as depicted in FIG. 5B may be configured to display a second section of electronic document 130. For example, the computer system may scroll electronic document 130 up in electronic window 110 in response to selection of scroll bar 140.

In one example, the computer system may be configured to associate electronic pane 150 with a location in electronic window 110 as depicted in FIGS. 3A and 3B, and associate electronic pane 152 with a location in electronic document 130 as depicted in FIGS. 4A and 4B. For example, the computer system may be configured to maintain electronic pane 150 in a same location in electronic window 110 independently of moving electronic document 130.

The computer system also may be configured to maintain electronic pane 152 in a same location in electronic document 130 in response to scrolling through electronic document 130. For example, the computer system may be configured to scroll electronic pane 152 upward in electronic window 110 in synchronization with scrolling through electronic document 130.

Figure 6A:
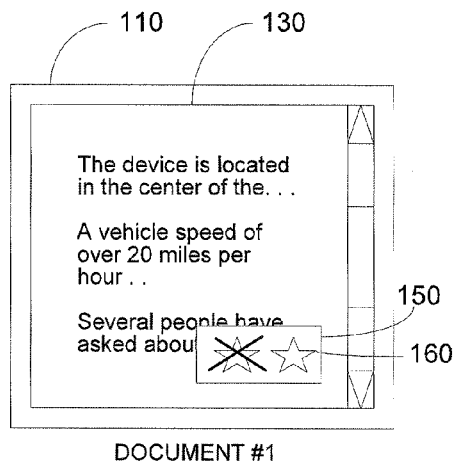
FIGS. 6A and 6B depict an example of a computer system configured to edit an object in the electronic pane.
Figure 6B:
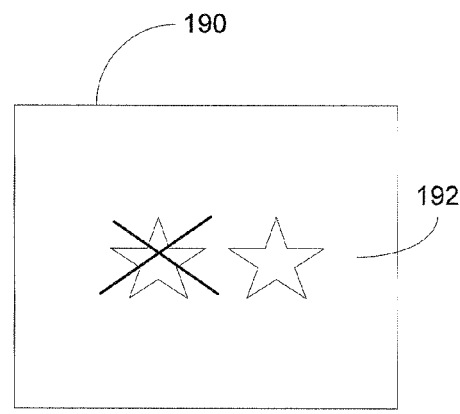

FIGS. 6A and 6B depict another example of a computer system, as set forth in FIG. 1, configured to manipulated object 160 and an electronic document. The computer system depicted in FIG. 6A may be configured to display electronic document 130 in electronic window 110, display electronic pane 150 over electronic document 130, and display object 160 in electronic pane 150.

In one example, the computer system may be configured to copy object 160 from data in electronic document 130 or copy object 160 from data 192 in a different electronic document 190. For example, the computer system may be configured to select, copy, and paste data 192 from electronic document 190 into electronic pane 150 in response to user commands. In one example, the computer system may be configured to create an electronic link, a label, and/or a table associating object 160 with data 192 in electronic document 190 or associating object 160 with data in electronic document 130.

A user may use a text and/or drawing editor to copy, delete, and/or edit object 160. The computer system may be configured to detect changes to object 160 and use the electronic link, the label, and/or the table to identify and make corresponding changes to data 192 in electronic document 190 or to identify and make corresponding changes to data in electronic document 130.

In another example, the computer system may be configured to detect changes to data 192 in electronic document 190 or detect changes to data in electronic document 130 and make corresponding changes to object 160 in electronic pane 150. For example, the user may open another document 190 and page or scroll to a location of data 192. The user may use the text and/or drawing editor to copy, delete, and/or edit data 192. The computer system may be configured to detect the changes to data 192 and use the electronic link, label, and/or table to identify and make corresponding changes to object 160 in electronic pane 150.

Figure 7A:
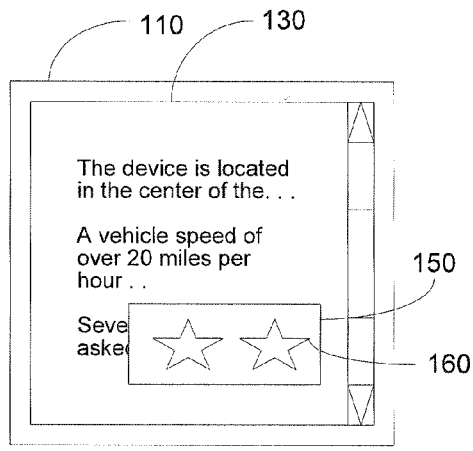
FIGS. 7A and 7B depict an example of a computer system configured to vary a size of an object in the electronic pane.
Figure 7B:
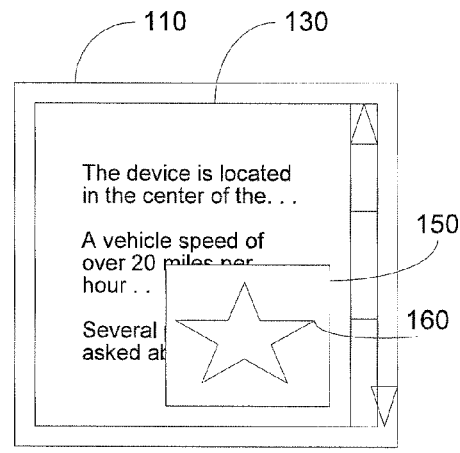

FIGS. 7A and 7B depict another example of a computer system, as set forth in FIG. 1, configured to vary a size of electronic pane 150 and/or object 160. The computer system depicted in FIG. 7A may be configured to display electronic pane 150 and object 160 at a first size. The computer system depicted in FIG. 7B may be configured to resize the electronic pane 150 and/or object 160. For example, the computer system may be configured to vary the size of electronic pane 150 and/or object 160 in response to a user selecting and moving an edge of electronic pane 150. In another example, the computer system may be configured to resize object 160 in electronic pane 150 in response to a user mouse or menu selection.

Figure 8:
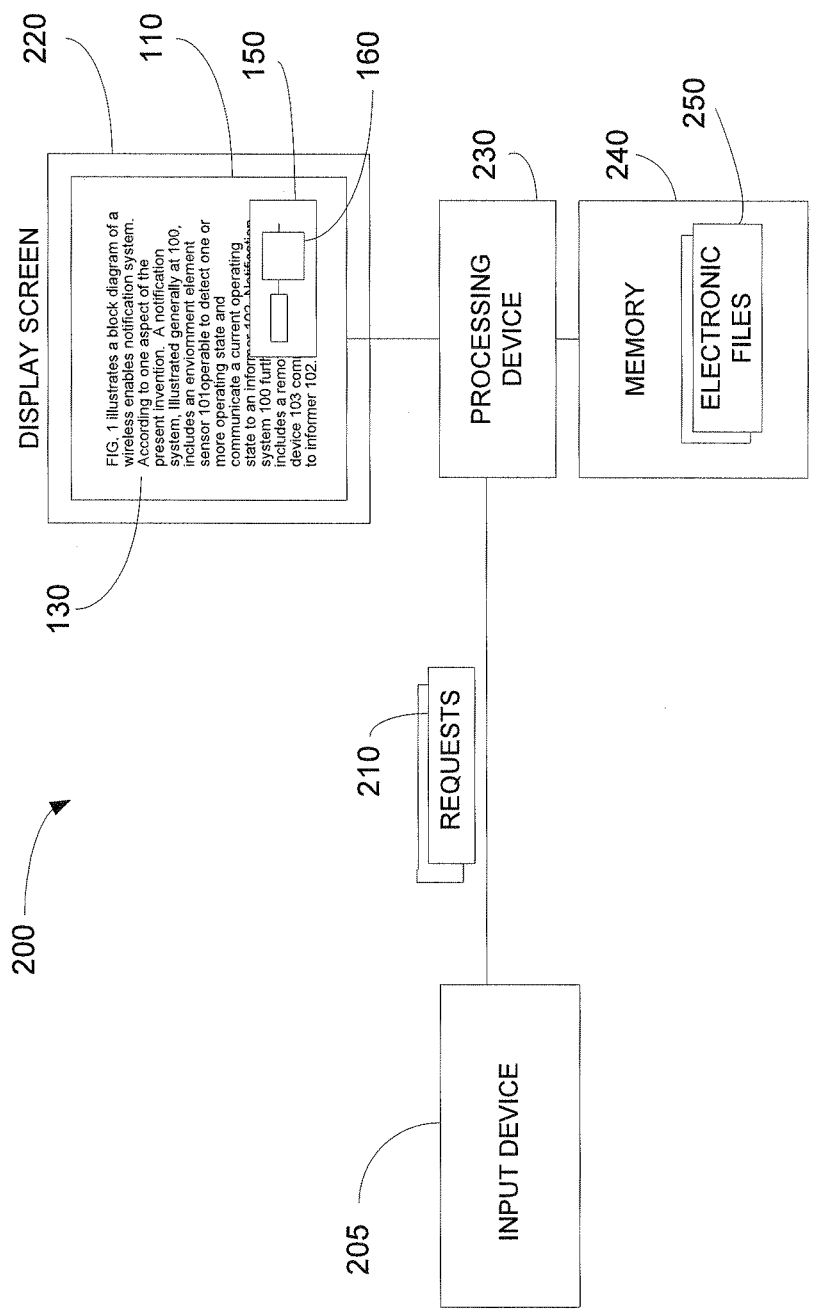
FIG. 8 depicts an example of a computer system configured to display the electronic pane.

FIG. 8 depicts an example of a computer system 200 configured to display electronic pane 150. Computer system 200 may comprise an input device 205, a display screen 220, a processing device 230, and a memory 240. Computer system 200 may be a personal computer (PC), laptop computer, smart phone, personal digital assistant (PDA), computer terminal, television, electronic notebook, electronic reader, network server, or any other device configured to display information, or the like, or any combination therefore.

Processing device 230 may comprise a programmable processor, a central processing unit (CPU), a logic circuit, a programmable logic device, or the like, or any combinations thereof. Memory 240 may comprise solid state memory devices, buffers, registers, discs, or the like, or any combination therefore. Different portions of memory 240 may be internal or external to processing device 230 or may be internal or external to computer system 100. For example, memory 240 may be located in a same chassis with processing device 130 or may be coupled to processing device 230 via a network.

Display screen 220 may comprise a stand-alone computer screen, or may comprise a computer screen incorporated into a same enclosure with processing device 230, memory 240, and/or input device 205. In one example, display screen 220 may be locally coupled to processing device 230. In another example, display screen 220 may be remotely coupled to processing device 230 via a network.

Input device 205 may comprise a keyboard, a mouse, a touch screen, and/or a computer, or the like, or any combination thereof. In one example, input device 205 may be locally coupled to processing device 230. For example, input device 205 and processing device 230 may comprise components in a same PC or portable computing device. In another example, input device 205 may comprise part of another computer configured to communicate with processing device 230 over a network connection.

Processing device 230 may be configured to receive requests 210 from input device 205. Requests 210 may direct processing device 230 to open electronic files 250 containing electronic documents, such as electronic document 130. Processing device 230 also may be configured to open electronic window 110 in display screen 220 and open electronic document 130 from one of the electronic files 250 in response to requests 210.

In one example, a first request 210 may direct processing device 230 to open electronic pane 150 in electronic window 110. A second request 210 may direct processing device 230 to copy object 160 from one of the electronic documents contained in electronic files 250 into electronic pane 150. A third request 210 may direct processing device 230 to move electronic pane 150, modify electronic pane 150, and/or modify object 160.

Figure 9:
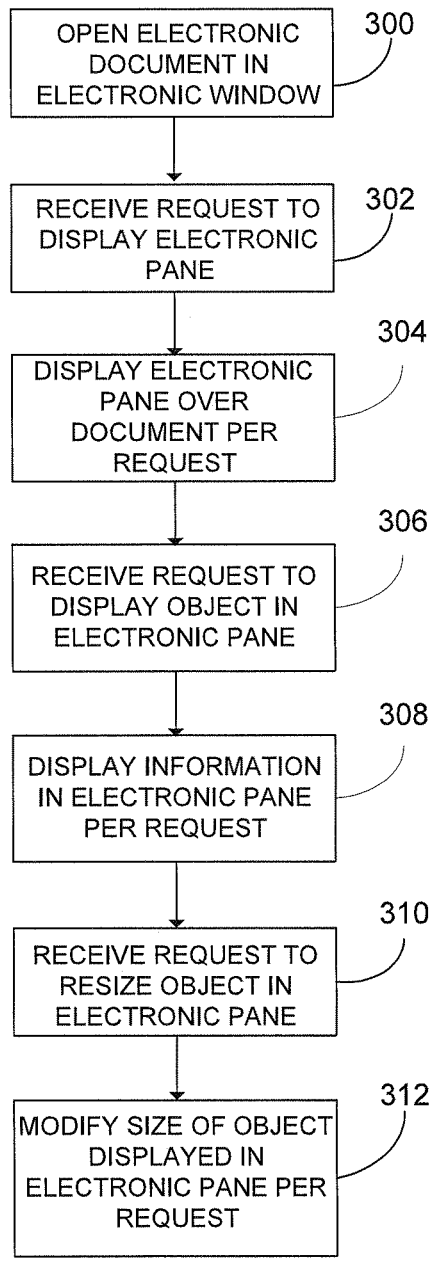
FIG. 9 depicts an example of a process for displaying the electronic pane.

FIG. 9 depicts an example of a process for displaying an electronic pane. In operation 300, the processing device may open and display the electronic document in an electronic window. In operation 302, the processing device may receive a request to display an electronic pane in the electronic document. In operation 304, the processing device may display the electronic pane over a portion of the electronic document in response to the request. In one example, the processing device may initially display the electronic pane substantially blank.

In operation 306, the processing device may receive requests to display an object in the electronic pane. For example, a first request may comprise selection of the object from the electronic document and a second request may comprise copying and pasting the object into the electronic pane. In operation 308, the processing device may copy and display the object in the electronic pane in response to the request. In one example, the processing device may paste the object into the substantially empty electronic pane and display the object substantially throughout the electronic pane.

In operation 310, the processing device may receive a request to resize the object in the electronic pane. For example, the processing device may receive a request to zoom-in or zoom-out on the object. In operation 312, the processing device may adjust a display size of the object in response to the request. For example, the processing device may be configured to enlarge the object in response to the zoom-in request and may be configured to shrink the object in response to the zoom-out request. In one example, the electronic document displayed in the electronic window may remain unchanged when changing the size of the object.

In one example, displaying the electronic document, receiving the request to display the electronic pane, displaying the electronic pane, receiving the request to display the object in the electronic pane, and displaying the object in the electronic pane may be controlled by the processing device via an application, such as a document editing application, a document viewing application, a web browser application, or the like, or any combination thereof.

Figure 10:
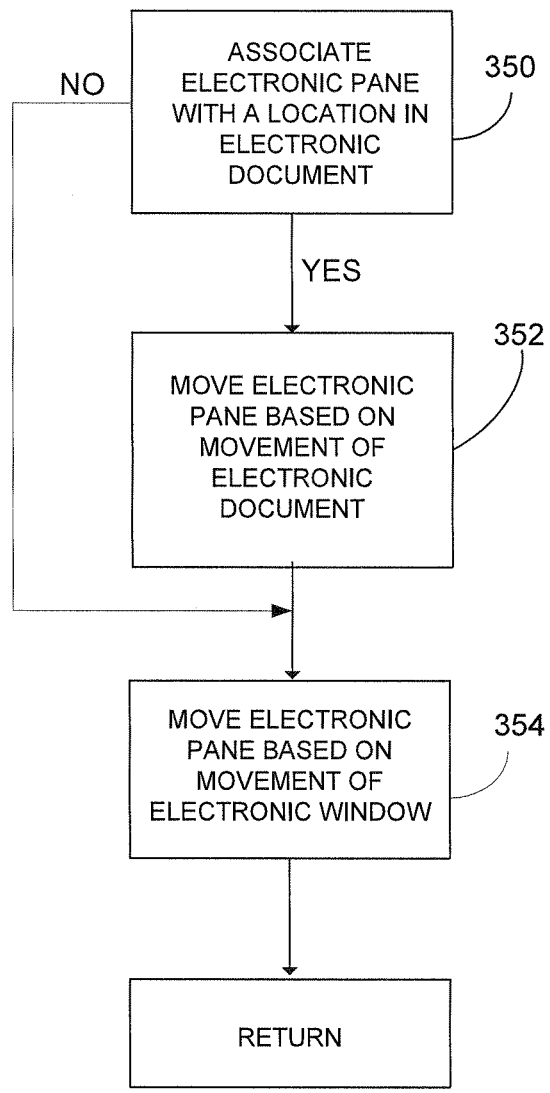
FIG. 10 depicts an example of a process for moving the electronic pane.

FIG. 10 depicts an example of a process for moving the electronic pane. In operation 350, the processing device may receive a request to associate the electronic pane with a location in the electronic document. For example, a user may select a menu option directing the processing device to associate the electronic pane with a location in the electronic document.

In operation 352, the processing device may move the electronic pane based on movements of the electronic document. For example, the electronic pane may currently be located and associated with in a first location in the electronic document. The user may scroll the electronic document to display a second location in the electronic document. The processing device in operation 352 may move the electronic pane in response to scrolling through the electronic document keeping the electronic pane positioned at the first location in the electronic document.

In operation 354, the processing device also may be configured to move the electronic pane based on movement of the electronic window. For example, a user may select and move the electronic window from a first location on the computer screen to a second location on the computer screen. The processing device may be configured to move the electronic pane in response to the movement of the electronic window maintaining the electronic pane in a same location in the electronic window when the electronic window moves from the first location to the second location on the computer screen.

In another example, the processing device may be configured to display and associate multiple electronic panes with the electronic document. A first electronic pane may be associated with a location in the electronic document and a second electronic pane may be associated with a location in the electronic window. The processing device in operation 352 may move the first electronic pane based on movement of the electronic document and the processor in operation 354 may move the first electronic pane and the second electronic pane based on movement of the electronic window.

Figure 11:
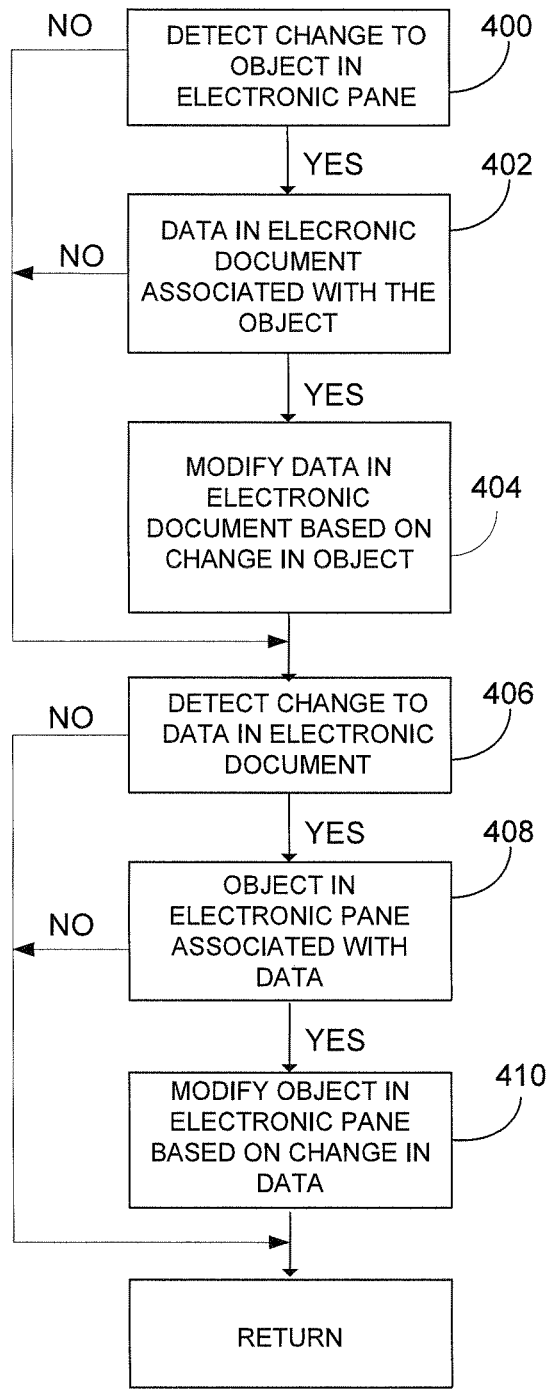
FIG. 11 depicts an example of a process for modifying an object associated with the electronic pane.

FIG. 11 depicts an example of a process for modifying an object in the electronic pane. In operation 400, the processing device may be configured to detect a change to the object displayed in the electronic pane. For example, the processing device may detect a user editing the object using a text and/or drawing editor. In operation 402, the processing device may identify the object as associated with data in an electronic document. For example, the processing device may associate the object with the data via a link, label, and/or table. The object may be associated with the same electronic document displayed in the electronic window or may be associated with a different electronic document. In operation 404, the processing device may modify the data in the electronic document based on the changes made to the object in the electronic pane. For example, the changes made to the object may be replicated for the data in the electronic document.

In operation 406, the processing device may detect a change to data located in the electronic document. The electronic document may be the same electronic document displayed in the electronic window or may be a different electronic document. In operation 408, the processing device may identify the object displayed in the electronic pane as associated with the data changed in the electronic document. In operation 410, the processing device may modify the object in the electronic pane to replicate the changes made to the data in the electronic document.

Figure 12:
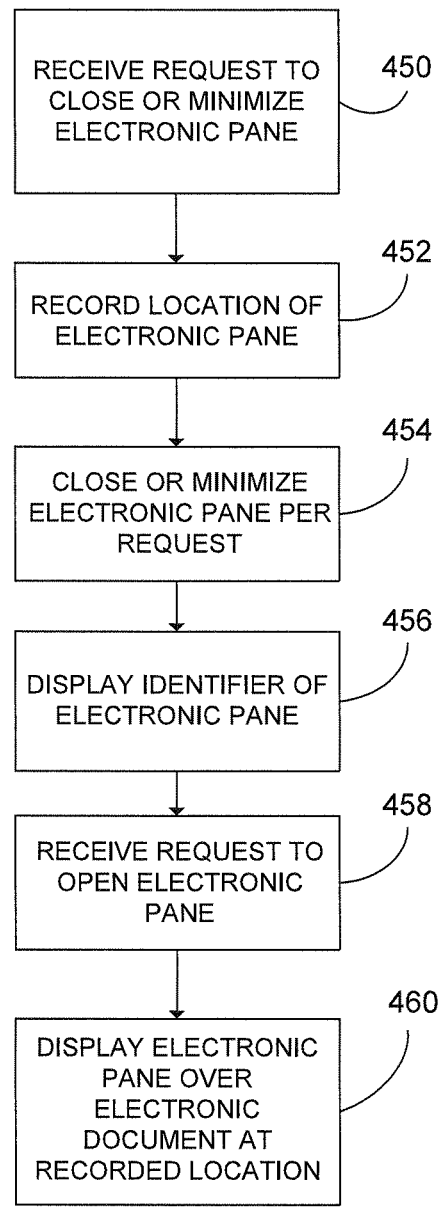
FIG. 12 depicts an example of a process for opening and closing the electronic pane.

FIG. 12 depicts an example of a process configured to open and/or close an electronic pane. In operation 450, the processing device may receive a request to close or minimize the electronic pane. For example, the processing device may detect selection of a first icon displayed in the electronic pane associated with closing the electronic pane or may detect selection of a second icon displayed in the electronic pane associated with minimizing the electronic pane.

In operation 452, the processing device may record a location of the electronic pane in response to the request. For example, the processing device may record the location of the electronic pane in the electronic document based on a previous association of the electronic pane with a location in the electronic document. Alternatively, the processing device may record the location of the electronic pane in the electronic window based on a previous association of the electronic pane with a location in the electronic window.

In operation 454, the processing device may be configured to close or minimize the electronic pane in response to the request. For example, the processing device may close the electronic pane in response the selection of the first icon and may minimize the electronic pane in response to the selection of the second icon.

In operation 456, the processing device may display an identifier in response to the request to minimize the electronic pane. For example, the processing device may be configured to display a thumbnail image in a task bar of the electronic window. In another example, the processing device may be configured to display an icon and/or a file name associated with the electronic pane.

In operation 458, the processing device may receive a request to open the electronic pane. For example, the processing device may detect selection of the identifier displayed in the task bar. In operation 460, the processing device may redisplay the electronic pane over the electronic document at the recorded location. For example, the electronic pane may be associated with a location in the electronic document. The processing device may be configured to display the electronic pane at the recorded location in the electronic document. In another example, the electronic pane may be associated with a location in the electronic window. The processing device may be configured to display the electronic pane at the recorded location in the electronic window.

The processing device also may be configured to receive a request to close or minimize the electronic document. The processing device may be configured to record the location of the electronic pane in the electronic document and/or record the location of the electronic pane in the electronic window in response to the request. The processing device may store the object and the electronic pane in a file. The processing device may receive a request to reopen the electronic document. The processing device may open the electronic document, open the file containing the electronic pane and the object, and display the electronic pane and the object at the recorded location in response the request.

The system and apparatus described above may use dedicated processor systems, micro controllers, programmable logic devices, or microprocessors that may perform some or all of the operations described herein. Some of the operations described above may be implemented in software and other operations may be implemented in hardware. One or more of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, minicomputer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. We claim all modifications and variation coming within the spirit and scope of the following claims.

The invention claimed is:

1. A method, comprising:
displaying, by a processing device, an electronic document in an electronic window within a computer screen;
receiving, by the processing device, a first request to open an electronic pane in the electronic document;
displaying, by the processing device, the electronic pane over a portion of the electronic document in response to the first request;
receiving, by the processing device, a second request to display information in the electronic pane;
displaying, by the processing device, the information in the electronic pane in response to the second request;
displaying, by the processing device, a first menu item within the electronic window for synchronizing movement of the electronic pane with movement of the electronic window;
displaying, by the processing device, a second menu item within the electronic window for synchronizing movement of the electronic pane with movement of the electronic document;

detecting, by the processing device, movement of the electronic window and synchronizing the movement of the electronic pane with the movement of the electronic window based on selection of the first menu item; and
detecting, by the processing device, movement of the electronic document and synchronizing the movement of the electronic pane with the movement of the electronic document based on selection of the second menu item.

2. The method of claim 1, wherein synchronizing the movement of the electronic pane with movement of the electronic window comprises displaying the electronic pane at a location within the electronic window independently of the movement of the electronic document.

3. The method of claim 1, further comprising:
receiving, by the processing device, a third request to move the electronic pane to a different location in the electronic window; and
moving, by the processing device, the electronic pane to the different location in response to the third request.

4. The method of claim 1, wherein synchronizing the movement of the electronic pane with the movement of the electronic document comprises displaying the electronic pane at a same location in the electronic document.

5. The method of claim 1, wherein synchronizing the movement of the electronic pane with the movement of the electronic document comprises moving the electronic pane within the computer screen in response to scrolling the electronic document.

6. The method of claim 1, further comprising:
displaying, by the processing device, an additional electronic pane over an additional portion of the electronic document while the electronic pane is displayed over the portion of the electronic document;
receiving, by the processing device, a third request to display additional information in the additional electronic pane; and
displaying, by the processing device, the additional information in the additional electronic pane in response to the third request.

7. The method of claim 6, further comprising moving the additional electronic pane to a different location within the computer screen in response to movement to a different location within the electronic document.

8. The method of claim 6, wherein displaying the electronic pane and the additional electronic pane comprise displaying the electronic pane and the additional electronic pane in static locations of the electronic window while scrolling the electronic document.

9. The method of claim 1, wherein displaying the information comprises displaying the information throughout the electronic pane.

10. The method of claim 1, wherein the information comprises data from the electronic document.

11. The method of claim 10, further comprising:
receiving, by the processing device, an input changing the data in the electronic document; and
changing, by the processing device, the information displayed in the electronic pane based on the input.

12. The method of claim 10, further comprising:
receiving, by the processing device, an input changing the information in the electronic pane; and
changing, by the processing device, the data in the electronic document based on the additional input.

13. The method of claim 1, wherein the information comprises data from an additional electronic document.

14. The method of claim 13, further comprising creating, by the processing device, a link associating the information displayed in the electronic pane to the data from the additional electronic document.

15. The method of claim 14, further comprising:
receiving, by the processing device, an input changing the information in the electronic pane;
identifying, by the processing device, via the link, the data from the additional electronic document; and
changing, by the processing device, the data based on the input.

16. The method of claim 1, further comprising:
detecting, by the processing device, movement of the electronic pane to a new location in the electronic window;
receiving, by the processing device, a third request to close the electronic pane;
closing, by the processing device, the electronic pane in response to the third request; and
displaying, by the processing device, an identifier in the electronic window associated with the electronic pane.

17. The method of claim 16, further comprising:
detecting, by the processing device, a selection of the identifier; and
reopening, by the processing device, the electronic pane in the new location in the electronic window and redisplaying the information in the electronic pane in response to the selection of the identifier.

18. The method of claim 1, further comprising:
receiving, by the processing device, a third request to close the electronic document;
closing, by the processing device, the electronic document and the electronic pane in response to the third request;
receiving, by the processing device, a fourth request to reopen the electronic document;
redisplaying, by the processing device, the electronic document in the electronic window in response to the fourth request;
redisplaying, by the processing device, the electronic pane over a portion of the electronic document in response to the fourth request; and
redisplaying, by the processing device, the information in the electronic pane in response to the fourth request.

19. The method of claim 1, further comprising:
receiving, by the processing device, a third request to resize the electronic pane; and
resizing, by the processing device, the electronic pane while maintaining a same size for the electronic document in response to the third request.

20. The method of claim 1, wherein displaying the electronic document, receiving the first request, displaying the electronic pane, receiving the second request, displaying the information in the electronic pane, displaying the first menu item and the second menu item, and synchronizing the movement of the electronic pane are controlled by the processing device via a document editing application.

21. The method of claim 1, wherein displaying the electronic document, receiving the first request, displaying the electronic pane, receiving the second request, displaying the information in the electronic pane, displaying the first menu item and the second menu item, and synchronizing the movement of the electronic pane are controlled by the processing device via a web browser.

22. The method of claim 1, wherein displaying the electronic document, receiving the first request, displaying the electronic pane, receiving the second request, displaying the information in the electronic pane, displaying the first menu item and the second menu item, and synchronizing the movement of the electronic pane are controlled by the processing device via a software operating system.

23. An apparatus, comprising:
a processing device configured to:
display an electronic document in an electronic window within a computer screen;
receive a first request to open an electronic pane in the electronic document;
display the electronic pane over a portion of the electronic document in response to the first request;
receive a second request to display information in the electronic pane;
display the information in the electronic pane in response to the second request;
display a first menu item within the electronic window for synchronizing movement of the electronic pane with movement of the electronic window;
display a second menu item within the electronic window for synchronizing movement of the electronic pane with movement of the electronic document;
detect movement of the electronic window and synchronizing the movement of the electronic pane with the movement of the electronic window based on selection of the first menu item; and
detect movement of the electronic document and synchronizing the movement of the electronic pane with the movement of the electronic document based on selection of the second menu item.

24. The apparatus of claim 23, wherein the processor is configured to:
maintain the electronic pane in a same location within the electronic window independently of movement of the electronic document based on the selection of the first menu item; and
maintain the electronic pane in a same location within the electronic document independently of movement of the electronic window based on the selection of the second menu item.

25. The apparatus of claim 23, wherein the processing device is further configured to:
detect changes to the information; and
change the electronic document based on the changes to the information.

26. The apparatus of claim 23, wherein the processing device is further configured to:
detect changes to the information; and
change an additional electronic document based on the changes to the information.

27. The apparatus of claim 23, wherein the processing device is further configured to:
detect changes to the electronic document; and
change the information based on the changes to the electronic document.

28. The apparatus of claim 23, wherein the processing device is further configured to:
identify a location of the electronic pane in the electronic window;
close the electronic pane;
receive an additional request to open the electronic pane; and
reopen the electronic pane at the location in the electronic window in response to the additional request.

29. The apparatus of claim 23, wherein the processing device is further configured to:
close the electronic document and the electronic pane;
receive an additional request to open the electronic document; and
reopen the electronic document and reopen the electronic pane in response to the additional request.

30. The apparatus of claim 23, wherein the information comprises a drawing.

31. The apparatus of claim 23, wherein the information comprises streaming data.

32. The apparatus of claim 23, wherein the information comprises an application.

33. The apparatus of claim 23, wherein the information comprises a media player.

34. The apparatus of claim 23, wherein the processing device is further configured to move the electronic pane independently of scrolling the electronic document based on the selection of the first menu item.

35. The apparatus of claim 23, wherein the processing device is further configured to scroll or resize the electronic document without moving or resizing the electronic pane.

36. The apparatus of claim 23, wherein the processing device is further configured to synchronize movement of the electronic pane with the movement of the electronic document based on selection of the second menu item.

37. The apparatus of claim 23, wherein the processing device is further configured to synchronize movement of the electronic pane with the movement of the electronic window based on selection of the first menu item.

38. A non-transitory computer-readable memory device having instructions stored thereon that, in response to execution by a processing device, cause the processing device to perform operations comprising:
displaying an electronic document in an electronic window;
displaying a viewing pane over a portion of the electronic document;
copying a drawing;
displaying the drawing in the viewing pane;
display a first menu item for synchronizing movement of the viewing pane with movement of the electronic window;
display a second menu item for synchronizing movement of the viewing pane with movement of the electronic document; and
wherein displaying the viewing pane comprises:
synchronizing movements of the viewing pane within a display screen with movements of the electronic document within the display screen based on selection of the first menu option, and
synchronizing movements of the viewing pane within the display screen with movements of the electronic window within the display screen based on selection of the second menu option.

39. The computer-readable memory device of claim 38, wherein displaying the viewing pane comprises linking the viewing pane to a location in the electronic document, and displaying the viewing pane at the location in the electronic document based on selection of the first menu option.

40. The computer-readable memory device of claim 38, wherein the operations further comprise displaying an additional viewing pane in the electronic window over a different portion of the electronic document and displaying an additional drawing in the additional viewing pane.

41. The computer-readable memory device of claim 38, wherein displaying the viewing pane comprises showing the viewing pane substantially blank when the viewing pane is initially opened and displaying the drawing in the viewing pane after the drawing is copied.

42. The computer-readable memory device of claim 38, wherein the operations further comprise:

detecting changes to the drawing in the viewing pane; and
changing the electronic document based on the changes to the drawing.

43. The computer-readable memory device of claim 38, wherein the drawing is copied from a location in an additional electronic document, and wherein the operations further comprise:
creating a link associating the drawing with the location in the additional electronic document;
detecting a change to the drawing;
identifying, via the link, the location in the additional electronic document; and
changing the additional electronic document at the location based on the change to the drawing.

44. The computer-readable memory device of claim 38, wherein the operations further comprise:
receiving a first request to close the electronic document;
identifying a location of the viewing pane in the electronic window;
closing the electronic document and closing the viewing pane in response to the first request;
receiving a second request to reopen the electronic document;
redisplaying the electronic document in the electronic window in response to the second request; and
redisplaying the viewing pane at the location of electronic window in response to the second request.

45. The computer-readable memory device of claim 44, wherein the operations further comprise:
receiving a request to change the displaying of the drawing from a first view to a second zoomed in view;
displaying the drawing in the second zoomed in view in response to the request.

46. The computer-readable memory device of claim 45, wherein displaying the electronic document comprises displaying the electronic document in a same view while displaying the drawing in the first view and the second zoomed in view.

* * * * *